(12) United States Patent
Wetzig et al.

(10) Patent No.: US 7,779,675 B2
(45) Date of Patent: Aug. 24, 2010

(54) LEAK INDICATOR COMPRISING A SNIFFER PROBE

(75) Inventors: Daniel Wetzig, Köln (DE); Stefan Mebus, Köln (DE)

(73) Assignee: Inficon GmbH, Cologne (DE)

( * ) Notice: Subject to any disclaimer, the term of this patent is extended or adjusted under 35 U.S.C. 154(b) by 282 days.

(21) Appl. No.: 11/884,757

(22) PCT Filed: Feb. 2, 2006

(86) PCT No.: PCT/EP2006/050625

§ 371 (c)(1),
(2), (4) Date: May 15, 2008

(87) PCT Pub. No.: WO2006/092352

PCT Pub. Date: Sep. 8, 2006

(65) Prior Publication Data

US 2008/0276692 A1 Nov. 13, 2008

(30) Foreign Application Priority Data

Mar. 3, 2005 (DE) .................. 10 2005 009 713

(51) Int. Cl.
*G01M 3/04* (2006.01)
(52) U.S. Cl. .......................... 73/40.7; 73/40
(58) Field of Classification Search ............. 73/40–49.8
See application file for complete search history.

(56) References Cited

U.S. PATENT DOCUMENTS

| | | | |
|---|---|---|---|
| 2,947,166 A | * | 8/1960 | Palmer et al. ............... 73/40.7 |
| 3,645,127 A | | 2/1972 | Mongodin et al. |
| 4,735,084 A | * | 4/1988 | Fruzzetti ................. 73/40.7 |
| 4,785,666 A | * | 11/1988 | Bergquist ................. 73/40.7 |
| 5,537,857 A | * | 7/1996 | Grosse ................... 73/40.7 |
| 5,907,092 A | * | 5/1999 | Bohm .................... 73/40.7 |
| 6,179,444 B1 | | 1/2001 | Plesko |

(Continued)

FOREIGN PATENT DOCUMENTS

DE 3247975 6/1984

(Continued)

OTHER PUBLICATIONS

International Preliminary Report on Patentability for PCT/EP02/06986 (9 pgs.).

*Primary Examiner*—David A. Rogers
(74) *Attorney, Agent, or Firm*—Marjama Muldoon Blasiak & Sullivan LLP

(57) ABSTRACT

The leak detector includes a basic device which includes a vacuum pump, a test gas sensor, and a hand-held sniffing probe. The sniffing probe is connected with the basic device via a flexible hose line which includes capillary tubes. At least two capillary tubes are provided, which are adapted to be opened via valves. Thus different capillary cross sections can be rendered operative. The dead time between the entry of the test gas into the sniffing probe and the detection by the test gas sensor can be changed and/or selected. Thus, even the smallest detectable leak rate can be changed and/or selected. The leak detector can be adapted to different requirements by the user without the need for exchanging the hose line. Further, it is possible to equip different leak detectors of the same device family with the same hose lines.

8 Claims, 1 Drawing Sheet

U.S. PATENT DOCUMENTS

| | | | |
|---|---|---|---|
| 2002/0073767 A1* | 6/2002 | Webb et al. | 73/40.7 |
| 2003/0233866 A1* | 12/2003 | Widt | 73/40 |
| 2004/0154379 A1* | 8/2004 | Enquist et al. | 73/40.7 |
| 2006/0090546 A1* | 5/2006 | McCoy et al. | 73/40.7 |
| 2006/0174696 A1* | 8/2006 | Komninos | 73/40.5 A |
| 2008/0000288 A1* | 1/2008 | Bley | 73/40.7 |

FOREIGN PATENT DOCUMENTS

| | | |
|---|---|---|
| DE | 3801893 | 2/1989 |
| DE | 19846798 | 4/2000 |
| DE | 19911260 | 9/2000 |
| GB | 2072852 | 10/1981 |
| JP | 62025229 | 2/1987 |
| WO | WO-03/008923 | 1/2003 |

* cited by examiner

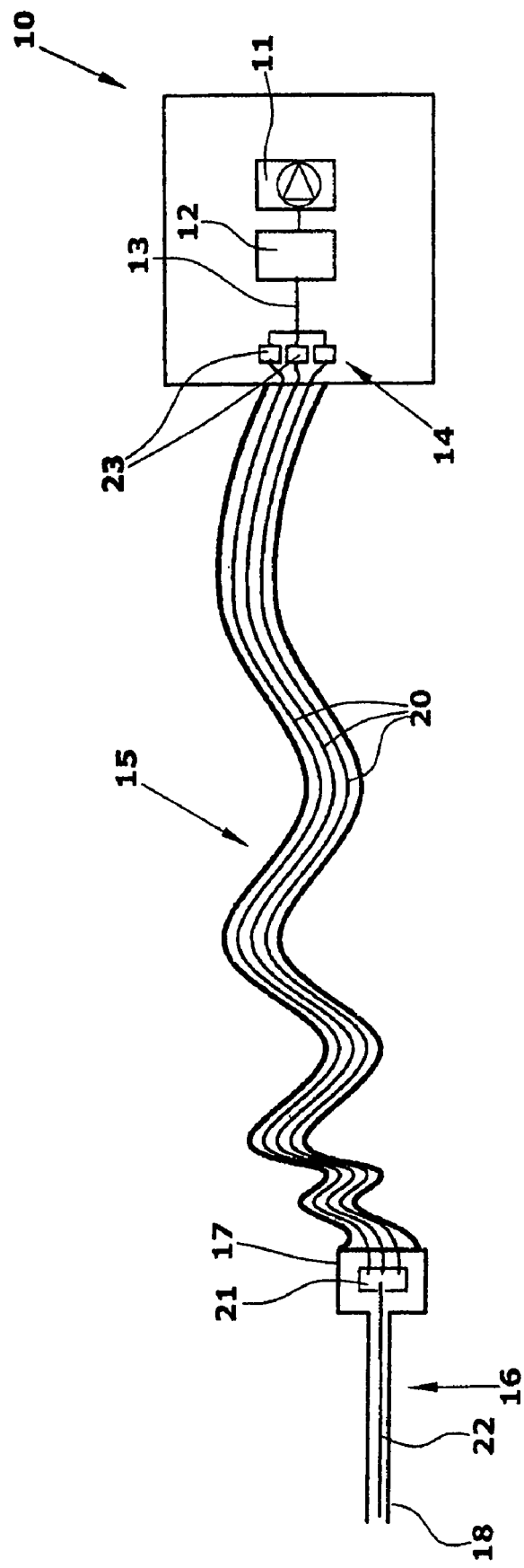

LEAK INDICATOR COMPRISING A SNIFFER PROBE

FIELD OF THE INVENTION

The invention relates to a leak indicator having a sniffer probe and comprising a main device which includes a vacuum pump and a test gas sensor and is connected with the sniffing probe via a hose line.

BACKGROUND OF THE INVENTION

In DE 44 45 829 A1 (Leybold A G) a counter-flow sniffing leak detector is described which comprises a high-vacuum pump stage at the end of a sniffing hose. An approximately 4 m long sniffing hose configured as a capillary line and having an inner diameter of approximately 0.4 mm is used. The sniffing hose exerts the required throttling effect for maintaining the vacuum generated at its outlet end.

DE OS 24 41 124 describes a leak detecting apparatus comprising a sniffing hose, where the hose has a relatively large diameter. Immediately in front of the test gas sensor, which is a mass spectrometer, a throttle is provided. Since a throttle is arranged immediately in front of the test gas sensor, the gas to be detected can be more rapidly delivered from the inlet of the sniffing probe to a place immediately in front of the throttle, i.e. to the test gas sensor, with the aid of the vacuum pump. Thus the response time, which depends on the length of the hose line, is reduced.

The applicant offers, inter alia, a device family comprising the ECOTEC and PROTEC devices which are leak detectors having a sniffing probe. The two devices differ from each other, inter alia, by the cross section of the capillary tube which connects the sniffing probe with the main device. The flow in the capillary tube is caused by the pressure difference between the inlet of the sniffing probe and the outlet end of the capillary tube at the main device, where a rough vacuum (p<250 mbar) is produced. In the main device the test gas proportion is permanently determined by the test gas sensor. From the measured test gas concentration and the gas flow, the leak rate of the leakages is determined.

Irrespective of the response time of the test gas sensor in the main device, the period between the gas entry into the sniffing probe and the signal indication is determined by the time it takes for the gas to pass through the capillary tube. This time is the so-called dead time. The longer the capillary tube is, the longer is the dead time of the system. At a predetermined capillary tube length, the dead time can be influenced by changing the flow velocity. The flow velocity, in turn, can be changed by changing the tube cross section and the pressure difference between the inlet and the outlet end of the capillary tube.

It is desirable to select as large a flow as possible in the sniffing probe such that the dead time is minimized and a sufficient amount of air is taken into the sniffing probe even from a larger distance. The test gas concentration c in the gas flow of the air taken in is shown by the following equation:

$$c = \frac{L}{q_{pV}}$$

where c is the concentration of the leak gas, L is the leak rate, and $q_{pV}$ is the gas flow through the capillary tube.

The smallest traceable leak rate corresponds to the smallest detectable test gas concentration. Thus the smallest traceable leak rate is impaired when the gas flow in the sniffing probe increases. Accordingly, the selected flow is always a tradeoff between the boundary conditions of minimum dead time and smallest traceable leak rate.

SUMMARY OF THE INVENTION

It is an object of the invention to provide a leak detector comprising a sniffing probe, which allows the optimum gas flow for a respective task to be selected without the need for exchanging the hose line.

According to the invention, the hose line connecting the sniffing probe with the main device comprises at least two capillary tubes which are adapted to be selectively closed in the main device or in the sniffing probe.

Selective opening of one or more valves allows that capillary tube to be selected through which the air is taken in. When the capillary tubes have different inner cross sections, the desired gas flow can be obtained, and consequently the dead time can be changed accordingly. The variable hose line or sniffing line allows devices meeting different requirements to be equipped with the same sniffing line as the aforementioned ECOTEC and PROTEC devices of the applicant, for example. Preferably, all capillary tubes have different cross sections.

The invention allows two different device types operating at different gas flows to be used in combination with the same hose line. The hose line comprises two capillary tubes. Only that tube extends into the main device, whose gas flow is suitable for the main device involved, while the other capillary tube remains unused. Thus one and the same sniffing line can be used for two devices operating at different gas flows without any valves being provided in the main device.

It is further possible to use the same capillary tubes and define the number of open capillary tubes by switching over the valves. In any case, varying flows can be obtained with one and the same hose line. In the main device the respective capillary tubes are opened via valves, with the capillary cross section allowing for the desired gas flow. At the unused capillary tubes the pressure difference between the inlet and the outlet is approximately 0 bar such that the open capillary tubes at the sniffing probe do not affect the gas flow.

An increase in the flow results in an increase of the distance sensitivity of the sniffing probe besides the reduction of the dead time.

An essential advantage of the invention is that the user, wishing to adapt the gas flow to the measurement situation, need not exchange the hose line. The switch-over is effected in the main device by operating the valve device which comprises the individual valves. One of the capillary tubes may be used for supplying a blocked sniffing probe with compressed air for the purpose of removing the blockage. Finally, it is possible to use the same hose line type for a device family where the devices operate at different gas flows.

Preferably, the valves are arranged in the main device. However, it is also possible to arrange the valves at the opposite end, i.e. in the sniffing probe.

An embodiment of the invention will now be described in greater detail with reference to the single FIGURE of the drawing.

BRIEF DESCRIPTION OF THE DRAWINGS

FIG. 1 shows a schematic view of a leak detector according to the invention.

DETAILED DESCRIPTION

The leak detector comprises a main device 10 provided with those components which need not be moved during leak detection. The main device 10 is configured as a tabletop or floor-mounted device. It comprises, inter alia, a vacuum pump 11 and a test gas sensor 12. A mass spectrometer or an infrared gas analyzer may be used as a test gas sensor. The vacuum pump 11 draws the air through the test gas sensor 12. The inlet 13 of the test gas detector is connected with a flexible hose line 15 via a valve device 14. The hose line which can be several meters long extends to the sniffing probe 16. The sniffing probe 16 is a hand-held device comprising a handle 17 and a sniffing line 18. The sniffing probe may configured as a gun.

The hose line 15 comprises a plurality of capillary tubes 20 which are connected to form a line block 21 in the sniffing probe 16. The line block 21 has a chamber into which leads an inlet line 22 extending through the sniffing line 18. The inlet line 22 branches in the line block 22 to form the individual capillary tubes 20 which are adapted to be individually shut off.

The valve device 14 serves for shutting off the capillary tubes. Said valve device comprises a plurality of valves 23, each valve being associated with one of the capillary tubes. Preferably, the valves 23 are magnetic valves which are electrically controlled. However, it is also possible to use hand-operated valves. The valves are switching valves which are adapted to be switched over between an open state and a closed state.

In the present embodiment, the capillary tubes 20 have different cross sections, and the valve device 14 is adapted to be operated such that only one valve 23 at maximum is open at a time.

During leak detection, a test gas is provided in the test object, for example a container. Helium is frequently used as a test gas which is introduced into the cavities to be tested for leaks prior closing said cavities. The test object is then scanned with the aid of the sniffing probe 16. The inlet line 22 takes in the test gas escaping through any existing leak, and the test gas is fed to the main device 10 to be analyzed there.

In one embodiment, the hose line 15 is 5 m long. It includes three capillary tubes with cross sections of 0.6 mm, 0.7 mm and 0.8 mm. Such a hose line may at option be operated with gas flows of 110 sccm, 200 sccm or 350 sccm.

The invention claimed is:

1. A leak detector having a sniffing probe and comprising a main device which includes a vacuum pump and a test gas sensor and is connected with said sniffing probe via a hose line,
   wherein
   said hose line comprises at least two capillary tubes which are adapted to be selectively closed in at least one of said main device and said sniffing probe.

2. The leak detector according to claim 1, wherein the capillary tubes have different cross sections.

3. The leak detector according to claim 1, wherein the capillary tubes are connected with a common line block in the sniffing probe, with an inlet line leading into said line block.

4. The leak detector according to claim 1, wherein the hose line is removably attached to the main device, and the main device comprises a connecting device for said hose line in which only one selected capillary tube is open whose gas flow is suitable for the respective main device.

5. The leak detector according to claim 1, wherein valves of the main device are arranged, said valves being adapted to be selectively closed.

6. The leak detector according to claim 5, wherein the valves are arranged at the sniffing probe.

7. The leak detector according to claim 5, wherein the valves are adapted to be operated such that only a maximum of one valve is open at a time.

8. The leak detector according to claim 5, wherein the valves are adapted to be opened in parallel in groups composed of selectable combinations.

\* \* \* \* \*

UNITED STATES PATENT AND TRADEMARK OFFICE
CERTIFICATE OF CORRECTION

PATENT NO. : 7,779,675 B2  Page 1 of 1
APPLICATION NO. : 11/884757
DATED : August 24, 2010
INVENTOR(S) : Daniel Wetzig et al.

It is certified that error appears in the above-identified patent and that said Letters Patent is hereby corrected as shown below:

Title Page Item (30) Foreign Application Priority Data, delete "10 2005 009 713" and replace with --10 2005 009 713.8--.

Signed and Sealed this

Ninth Day of November, 2010

David J. Kappos
*Director of the United States Patent and Trademark Office*